United States Patent [19]

Hoppe et al.

[11] Patent Number: 5,460,631
[45] Date of Patent: Oct. 24, 1995

[54] BIFUNCTIONAL REACTIVE DYESTUFF MIXTURE

[75] Inventors: Manfred Hoppe, Kürten; Karl-Josef Herd, Odenthal; Konrad Bootz, Wetter; Stefan Ehrenberg; Thomas Eizenhöfer, both of Köln; Wolfgang Harms, Odenthal; Hermann Henk, Köln; Klaus Kunde, Neunkirchen-Seelscheid; Stefan Meier; Wolfram Reddig, both of Leverkusen, all of Germany

[73] Assignee: Bayer Aktiengesellschaft, Leverkusen, Germany

[21] Appl. No.: 260,153

[22] Filed: Jun. 15, 1994

[30] Foreign Application Priority Data

Jun. 22, 1993 [DE] Germany .................. 43 20 632.8

[51] Int. Cl.$^6$ .................. C09B 67/22; D06P 1/38; D06P 3/66; D06P 3/10
[52] U.S. Cl. .................. 8/549; 8/532; 8/638; 8/639; 8/641; 8/643; 8/918
[58] Field of Search .................. 8/543, 549, 638, 8/639, 641, 643

[56] References Cited

U.S. PATENT DOCUMENTS

| | | |
|---|---|---|
| 4,338,093 | 7/1982 | Hildebrand et al. . |
| 4,540,418 | 9/1985 | Itake et al. .................. 8/524 |
| 4,568,350 | 2/1986 | Rohrer .................. 8/543 |
| 4,693,725 | 9/1987 | Yamauchi et al. .................. 8/527 |
| 4,711,645 | 12/1987 | Kumar . |
| 5,047,067 | 9/1991 | Miyazaki et al. . |
| 5,254,136 | 10/1993 | Fujii et al. . |
| 5,304,221 | 4/1994 | Schwarz et al. . |

FOREIGN PATENT DOCUMENTS

| | | |
|---|---|---|
| 0044483 | 1/1982 | European Pat. Off. . |
| 0198198 | 10/1986 | European Pat. Off. . |
| 316778 | 5/1989 | European Pat. Off. . |
| 0525805 | 3/1993 | European Pat. Off. . |
| 0545219 | 6/1993 | European Pat. Off. . |
| 0582893 | 2/1994 | European Pat. Off. . |

Primary Examiner—Margaret Einsmann
Attorney, Agent, or Firm—Sprung Horn Kramer & Woods

[57] ABSTRACT

Reactive dyestuff mixtures containing one or more monochlorotriazine dyestuffs of the formula (1)

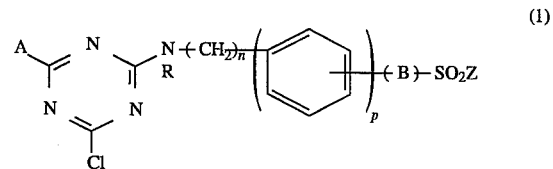

and one or more monofluorotriazine dyestuffs of the formula (2)

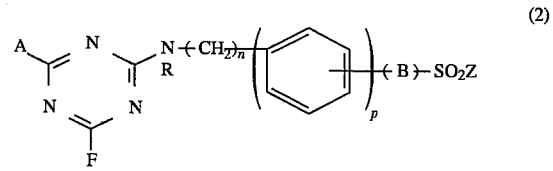

in which the substituents have the meaning given in the description, show on-tone exhaustion onto fibres and are fixed uniformly even under different fixation conditions.

11 Claims, No Drawings

BIFUNCTIONAL REACTIVE DYESTUFF MIXTURE

The invention relates to a mixture of bifunctional reactive dyestuffs which give improved results in practical application, in particular when used for dyeing cellulose fibres, to a dyeing process and to dyed substrates.

The use of reactive dyestuffs in mixtures for improving the properties in practical application and the appearance of the goods is already known.

U.S. Pat. No. 4,338,093 (=EP-A-44, 483) relates to mixtures of reactive dyestuffs producing the same hue but exhibiting different reactivity. According to Example 6, a fluorotriazine is used together with a chlorotriazine dyestuff. U.S. Pat. No. 5,047,067 describes mixtures of reactive dyestuffs having different reactive groups, different substantivities but approximately the same hue. EP-A-525,805 describes a mixture of at least five reactive dyestuffs which in part may contain a halotriazine and a vinylsulphonyl group.

However, the known combinations still have disadvantages in that they exhaust unevenly onto the substrates to be dyed, are not fixed uniformly and are therefore limited, especially with respect to their use on short-liquor dyeing machines.

The present invention relates to reactive dyestuff mixtures containing one more monochlorotriazine dyestuffs of the formula (1)

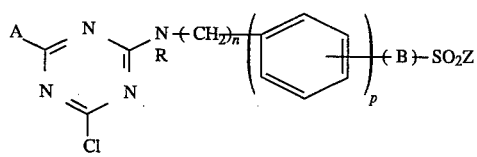
(1)

and one or more monofluorotriazine dyestuffs of the formula (2)

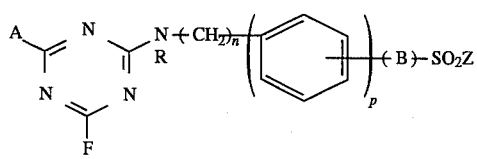
(2)

in which

A denotes a chromophoric radical

R denotes H, $C_1$–$C_4$-alkyl, OH—, $SO_3H$—, $OSO_3H$—, $SO_2Z$—, CN— or $CO_2H$-substituted $C_1$–$C_4$-alkyl, benzyl, phenyl or halogen-, $C_1$–$C_4$-alkyl -, $C_1C$–$C_4$-alkoxy-, $SO_3H$— or $CO_2H$— substituted phenyl, n denotes 0, 1, 2 or 3 p denotes 0 or 1

B denotes $-(CH_2)_{1-6}$, $CONH-(CH_2)_{2-4}$ or a direct bond

Z denotes vinyl or $CH_2CH_2$—Y where Y=a radical which can be eliminated under alkaline conditions, such as, for example, Cl, $OSO_3H$, $S_2O_3H$, $OCOCH_3$, $OPO_3H_2$ or OH, and the meanings of the indices and substituents in formula (2) are independent of the meanings in formula (1).

Preference is given to reactive dyestuff mixtures containing one or more monochlorotriazine dyestuffs of the formula (3)

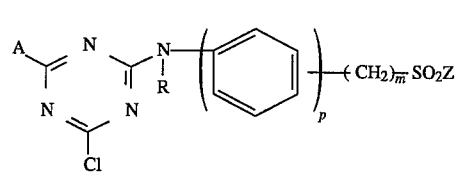
(3)

and one or more monofluorotriazine dyestuffs of the formula (4)

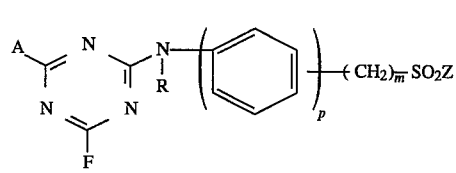
(4)

in which

R denotes H, $C_1$–$C_4$-alkyl, phenyl or $CH_3$—, $SO_3H$— or $CO_2H$— substituted phenyl, m denotes 0, 1, 2 or 3, and A, p and Z have the abovementioned meaning.

Particular preference is given to reactive dyestuff mixtures containing one or more monochlorotriazine dyestuffs of the formula (5)

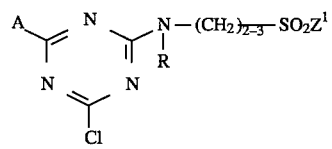
(5)

and one or more monofluorotriazine dyestuffs of the formula (6)

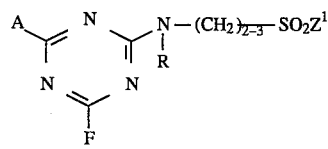
(6)

in which

R denotes phenyl or H, $Z^1$ denotes vinyl, $CH_2CH_2Cl$ or $CH_2CH_2OSO_3H$, and A has the abovementioned meaning.

Likewise, preference is given to reactive dyestuff mixtures containing one or more monochlorotriazine dyestuffs of the formula (7)

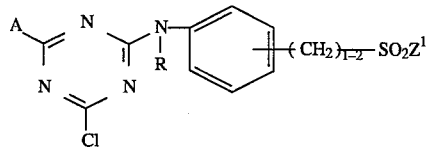
(7)

and one or more monofluorotriazine dyestuffs of the formula (8)

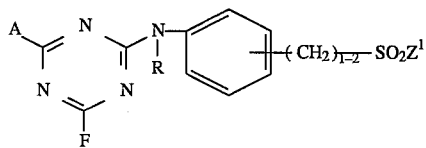

(8)

in which

R denotes H, $C_2H_5$, $CH_2CH_2OH$ or $CH_2CH_2CO_2H$
and A and $Z^1$ have the abovementioned meaning.

Preference is given in particular to two-component reactive dyestuff mixtures in which in (1) and (2) (or in (3) and (4) or in (5) and (6) or in (7) and (8)) their chromophoric radicals A are in each case identical.

A represents a chromophoric radical such as is customary for sulphur-containing water-soluble reactive dyestuffs, in particular a chromophoric radical from the azo, polyazo, metal complex azo, anthraquinone, formazan, copper phthalocyanine or triphendioxazine series. The triazinyl radical is predominantly attached to an amino function in the chromophoric radical A.

Examples of the radical A based on azo dyestuffs are:

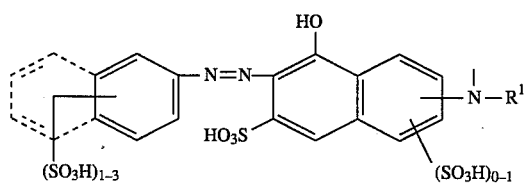

(9)

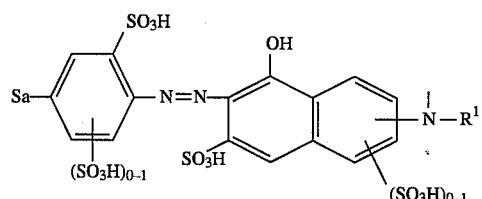

where Sa = $OCH_3$ or $OC_2H_5$ (10)

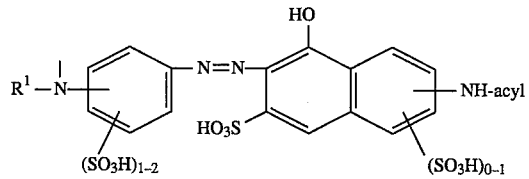

(11)

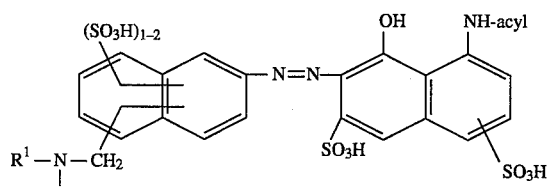

(12)

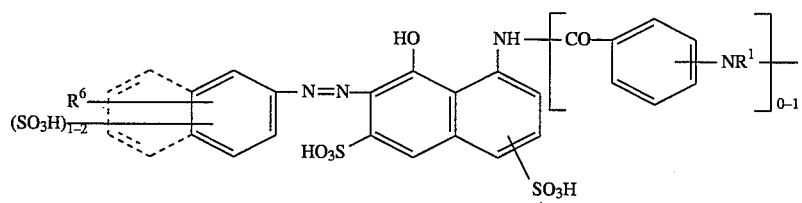

(13)

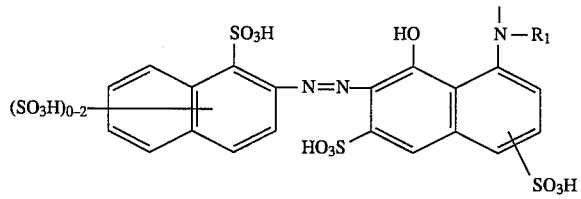

(14)

-continued
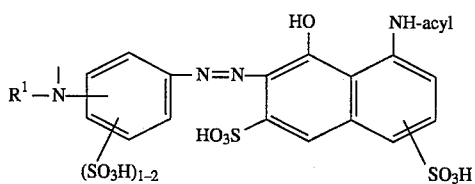 (15)
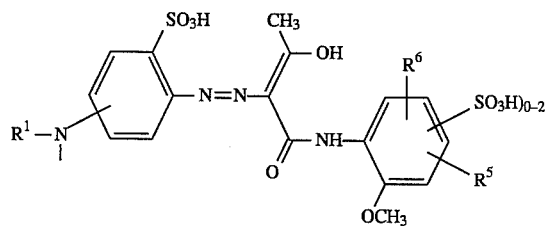 (16)
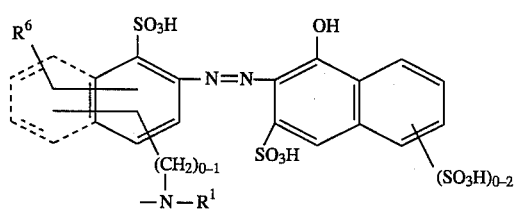 (17)
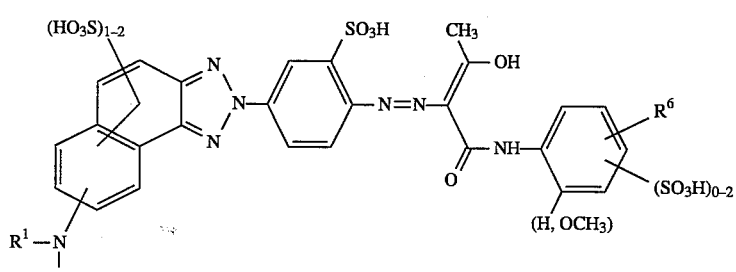 (18)
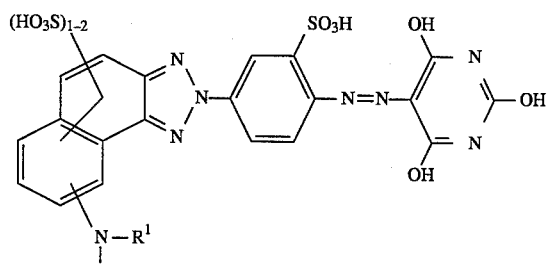 (19)
and metal comlexes of dyestuff radicals
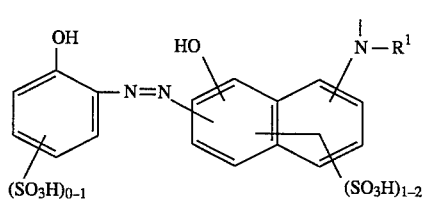 (20)
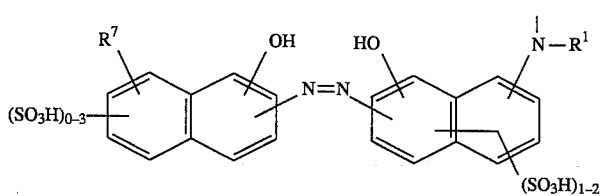 (21)

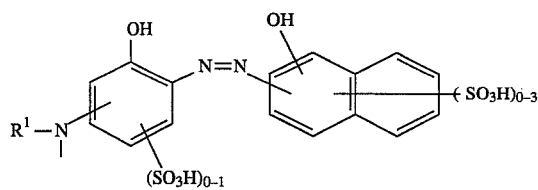
(22)
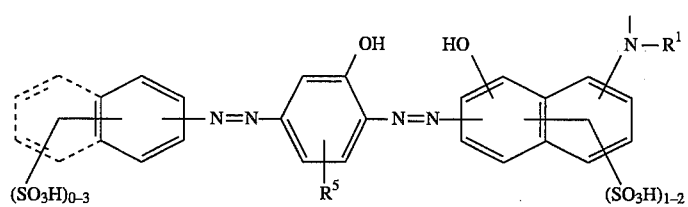
(23)
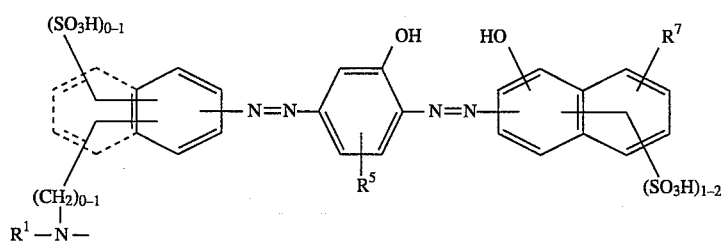
(24)
Preferred metal atoms are Cu (1:1 complex) or Cr and Co (1:2 complex). Cr complexes and Co complexes can contain the azo compound of the abovementioned formula once or twice, i.e., they can have a symmetrical or, together with any other ligand groups, an unsymmetrical structure.
Furthermore, A represents
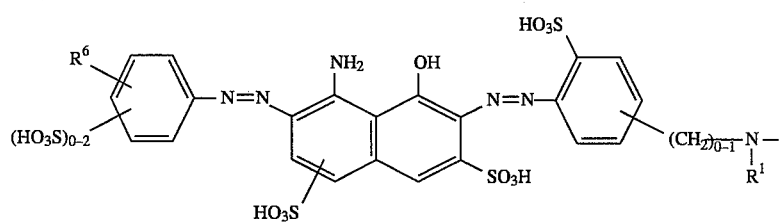
(25)
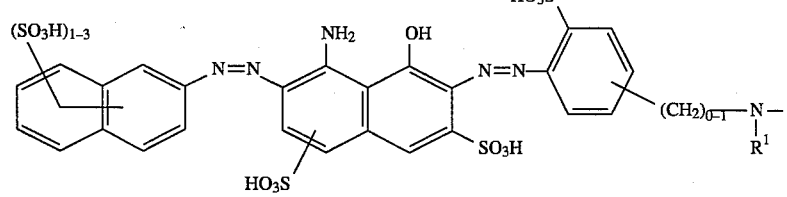
(26)
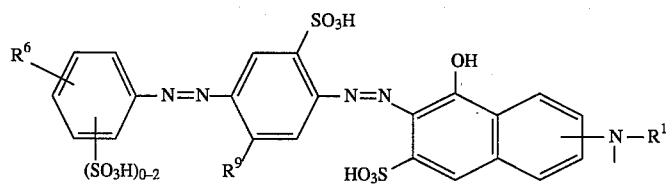
(27)
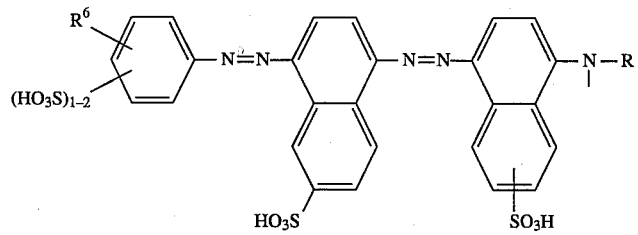
(28)

-continued
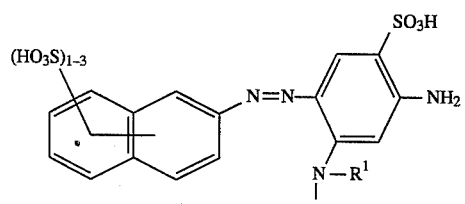
(29)
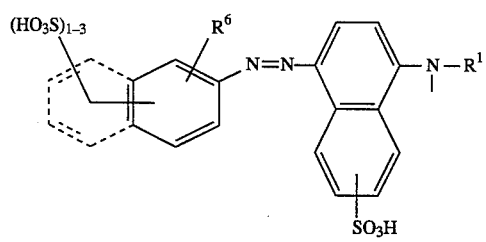
(30)
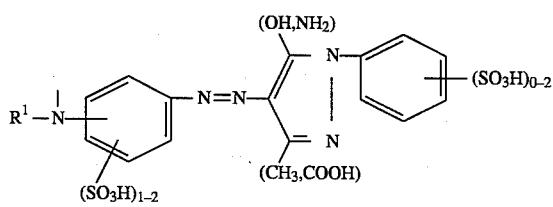
(31)
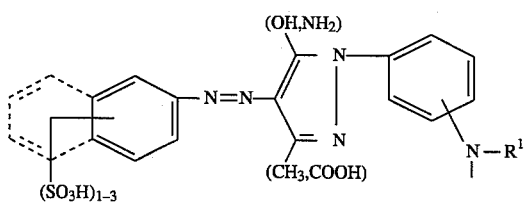
(32)
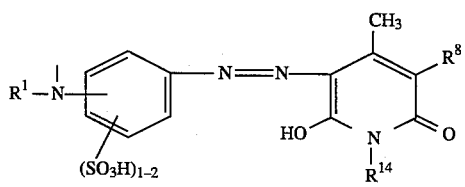
(33)
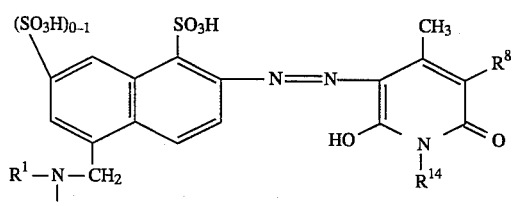
(34)
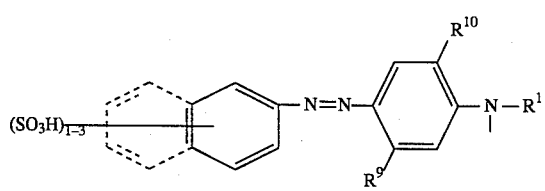
(35)

-continued

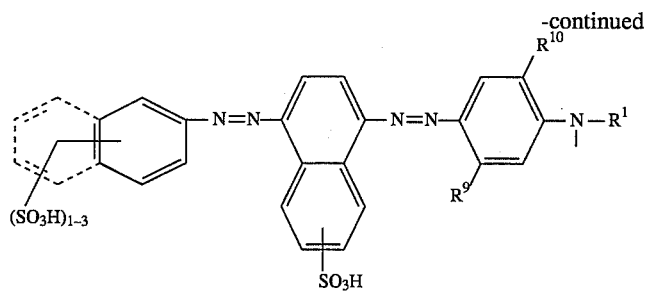
(36)

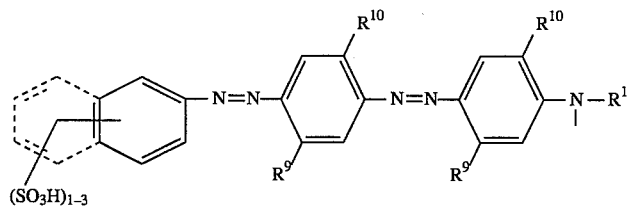
(37)

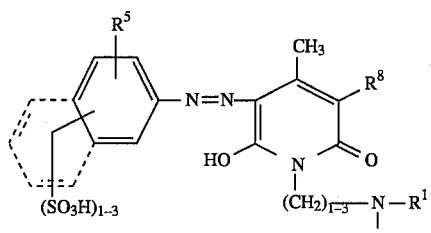
(38)

in which acyl is, for example, acetyl or substituted or unsubstituted benzoyl, $R^{14}$ is H, $C_1$–$C_2$-alkyl which is unsubstituted or substituted by $SO_3H$, $NH_2$, $R^1$ is H, $CH_3$ or $C_2H_5$, $R^5$ is H, $CH_3$, $OCH_3$ or Cl, $R^6$ is H, $C_1$–$C_4$-alkyl, $C_1$–$C_4$-alkoxy, Cl, Br, COOH or $SO_2=CH_2$ or $SO_2CH_2CH_2OSO_3H$, $R^7$ is H, OH, $NH_2$, $NHCOCH_3$, NHCOPh, Cl, $C_1$–$C_4$-alkoxy or $C_1$–$C_4$-alkyl, $R^8$ is H, $SO_3H$, $CH_2SO_3H$, Cl, $C_1$–$C_4$-alkylsulphonyl, CN, carboxamide, in particular $CONH_2$ and $CH_2SO_3H$, $R^9$ is H, $C_1$–$C_4$-alkyl, $C_1$–$C_4$-alkoxy, Cl, Br, acylamino, in particular $C_1$–$C_4$-alkylcarbonylamino or arylcarbonylamino, such as substituted or unsubstituted phenylcarbonylamino, $C_1$–$C_4$-alkylsulphonylamino, aminocarbonylamino, $C_1$–$C_4$-alkylsulphonylamino, arylsulphonylamino, $R^{10}$ is H, $C_1$–$C_4$-alkyl, $C_1$–$C_4$-alkoxy, OH, $SO_3H$.

The fused rings indicated by short dashes represent naphthalene systems which are a possible alternative.

Further examples of A are

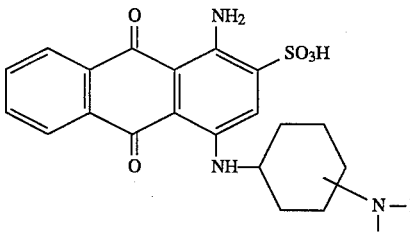
(39)

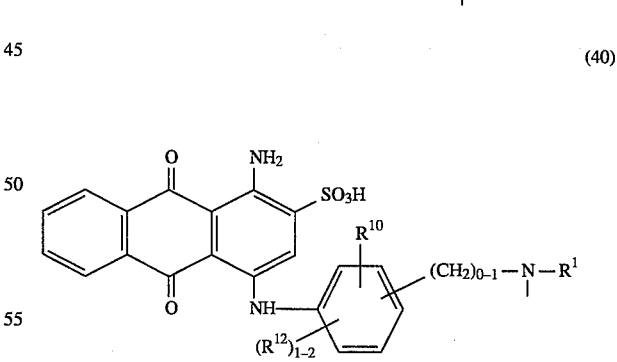
(40)

in which $R^{10}$ is H, methyl, methoxy or $SO_3H$,
$R^{12}$ is H, methyl or ethyl,
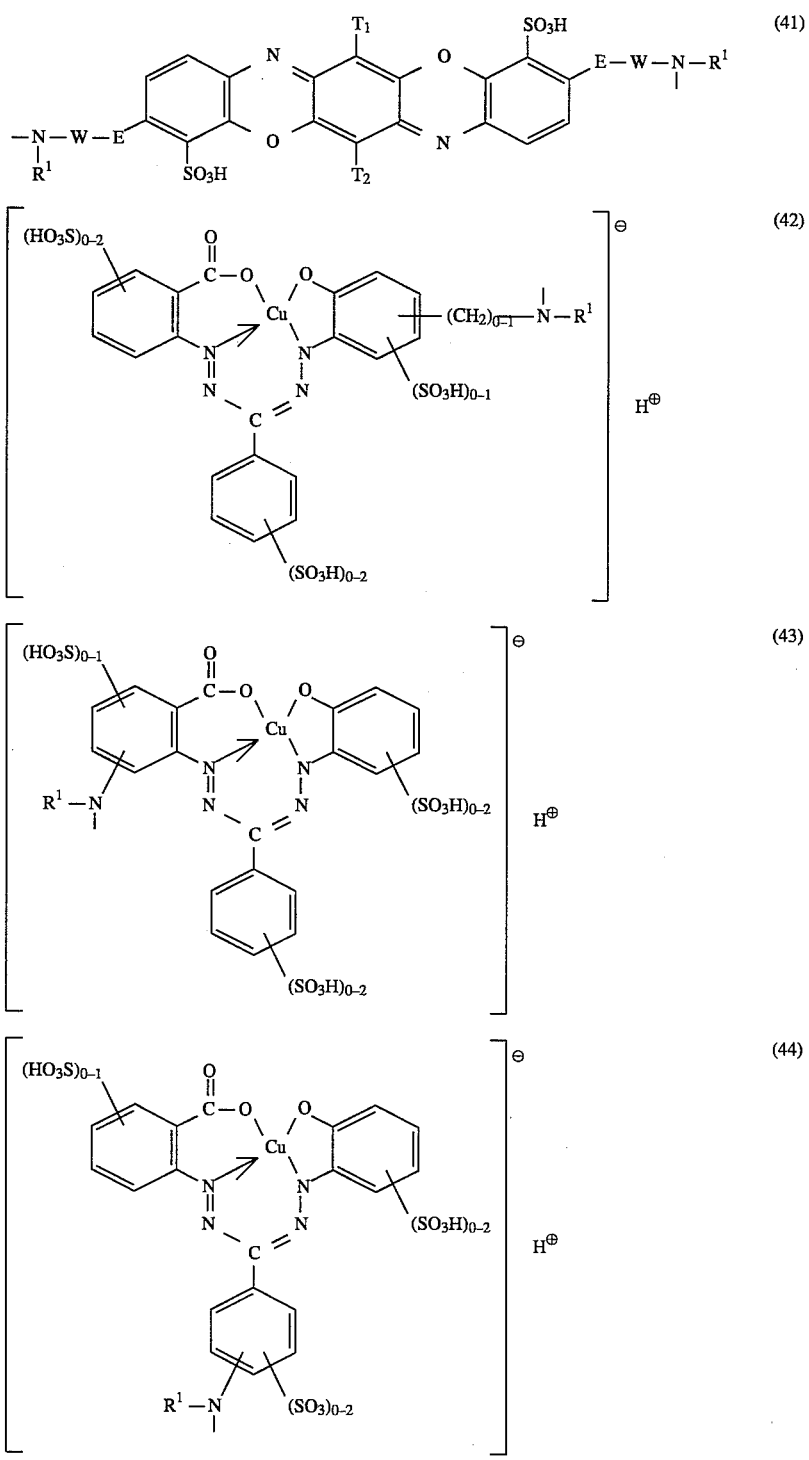

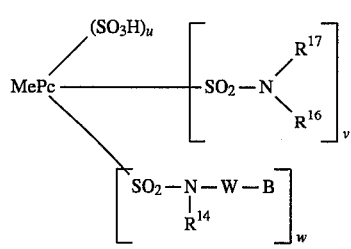

(45)

in which in formula (45)

Me is Cu, Ni,

Pc is the radical of a phthalocyanine u+v+w is 3.4–4.0, with the proviso that u is 0.8–2.0, v is 0–1.0, w is 1.0–3.0, and

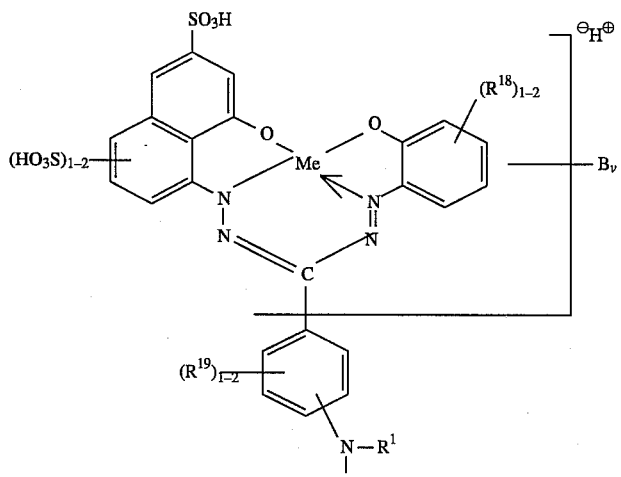

(46)

in which in all formulae 39–46

W denotes a substituted or unsubstituted phenylene or a substituted or unsubstituted aromatic-aliphatic bridging member or a straight-chain or branched $C_1$–$C_6$-alkylene which may be interrupted by groupings containing hetero atoms, such as $NR^{13}$, O or S, and can be substituted by $C_1$–$C_6$-alkoxy, or $OSO_3H$, $SO_3H$, COOR or halogen, E denotes —$NR^{15}$— or O, $T_1$, $T_2$ denote, independently of one another, H, Cl, Br, $C_1$–$C_2$-alkyl, $OCH_3$, $OC_2H_5$, acylamino, $C_1$–$C_2$-alkoxycarbonyl and $R^{13}$, $R^{15}$ denote, independently of one another, H, $C_1$–$C_4$-alkyl which may be substituted by OR', $OSO_3H$, $SO_3H$, COOR' or halogen and in which within a bridging member W the group $NR^{13}$ together with the group $NR^1$ can also form a heterocyclic aliphatic ring, and $R^1$, R' denote, independently of one another, H, $CH_3$ or $C_2H_5$, $R^{17}$ and $R^{16}$ denote H, $C_1$–$C_2$-alkyl which is unsubstituted or substituted by OH, $OSO_3H$, $SO_3H$ or COOH, $R^{18}$, $R^{19}$ denote, independently of one another, H, $C_1$–$C_4$-alkyl, $C_1$–$C_4$-alkoxy, OH, halogen, COOH, $NO_2$, $SO_3H$, sulphonamido, $C_1$–$C_4$-alkylcarbonylamino, substituted or unsubstituted phenylcarbonylamino, $C_1$–$C_4$-alkylsulphonylamino, substituted or unsubstituted phenylsulphonylamino, v, w denote 0 or 1, w being different from v.

The mixtures according to the invention can be present in solid, in particular pulverulent, form or in the form of granules. Usually, they additionally contain electrolyte salts such as NaCl, KCl, $Na_2SO_4$, which my originate from the synthesis, furthermore buffer substances, such as alkali metal acetates, alkali metal phosphates or alkali metal hydrogen phosphates, sodium borate. Furthermore, other substances customary for dyestuff preparations may be present, for example hydrotropic agents, wetting agents, fixing agents, siccatives, fungicides organic anionic dispersants or dustproofing agents or dyeing assistants.

The mixtures can also be present as an aqueous or aqueous organic solution, their pH being in general about 4 to 7 more preferable about 6.5 to 7.5.

The dyestuff mixtures according to the invention can be prepared in a manner known per se, for example, by mixing the individual solid dyestuff components obtainable from the synthesis by salting-out or spray-drying of the synthesis solution or by mixing the synthesis solutions of the individual dyestuff components, followed by joint isolation by salting-out or spray-drying. The customary abovementioned additives can be added to the solutions themselves, possibly before their spray-drying, or to the solid individual components or their mixtures.

The monochlorotriazine dyestuffs (1) and monofluorotriazine dyestuffs (2) are in general present in the dyestuff mixtures according to the invention in a weight ratio of 95:5 to 5:95. A preferred mixing ratio is 70:30 to 30:70, in particular 60:40 to 40:60.

Dyestuffs (1) and (2) are known or their chemical structure is analogous to that of known dyestuffs, so that the dyestuffs not yet described per se can be prepared analogously to the dyestuffs described per se.

Examples of dyestuffs (1) and (2) are described in DE-A4, 106,099, EP-A-70,806, EP-A-70,807, DE-A-2,614,550, EP-A-74,928, EP-A-307,817, EP-A-141,367, EP-A-374,758 and EP-A-70,808.

The mixtures according to the invention are used for dyeing and printing hydroxyl- and amido-containing materials, in particular cellulose.

EXAMPLE 1

100 parts of cotton knitwear are treated at 30° C. with 1000 parts of an aqueous dyeing liquor containing 2 parts of a standardized dyestuff mixture consisting of 50 parts of dyestuff 2A 50 parts of dyestuff 1A

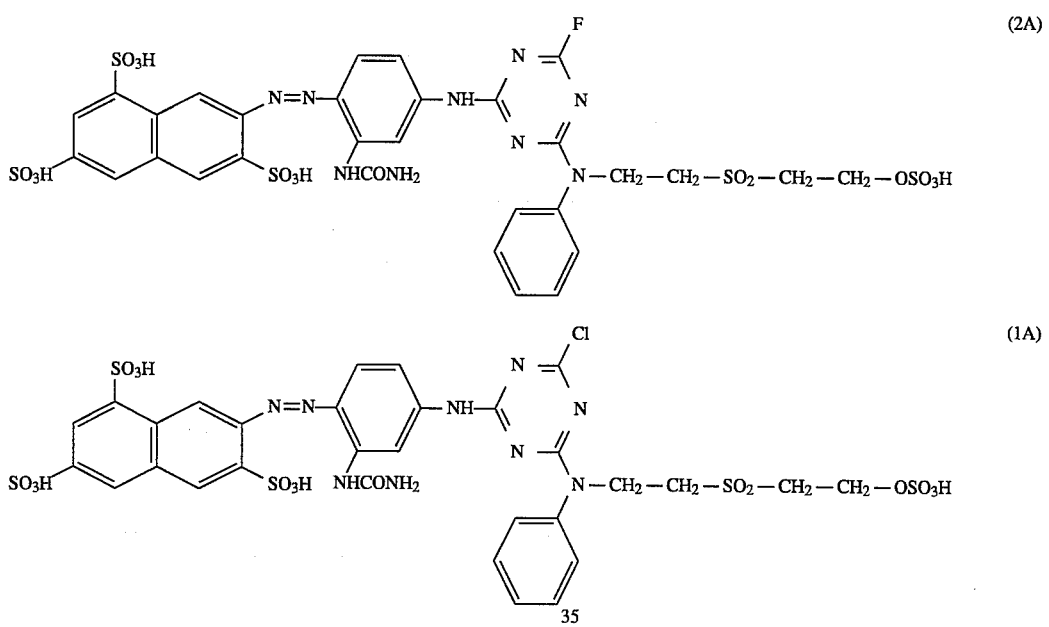

The combinations used in today's practice have proved to be unsuitable with respect to many requirements, since the individual dyestuffs used for combination dyeings often have different properties—such as, for example, substantivity, reactivity, migration behaviour, sensitivity to salt and temperature or dependence on the liquor ratio.

In a combination of the customary user put together under coloristic aspects, these properties frequently lead to uneven exhaustion and fixation, in particular in short-liquor dyeing machines, so that its application in this respect is limited.

Surprisingly, the dyestuff mixtures according to the invention show uniform on-tone exhaustion on the fibre and are fixed uniformly, even under different fixation conditions.

Accordingly, the mixtures according to the invention are highly suitable for a multiplicity of dyeing methods.

The following may be mentioned:

Dyeing from a long liquor (liquor ratio of 30:1→5:1)

a) while heating from 30°–40° C. to 60°–80° C. with the addition of sodium carbonate, sodium bicarbonate or NaOH b) at a constant temperature, for example 30°–80° C. with the addition of sodium carbonate or sodium carbonate/NaOH, c) by the "all-in" method, i.e., dissolution of the dyestuff mixture with alkali at 30°–50° C., followed by heating to 60°–80° C.

½ part of sodium bicarbonate 50 parts of sodium chloride and 20 parts of sodium carbonate (anhydrous)

in dissolved form.

After the dyestuff has been evenly distributed on the fibre material at 30° C. over a period of 45 minutes, the liquor is heated to 60° C. over a period of 30 minutes, and the material is treated at this temperature for 90 minutes with vigorous agitation of the goods and efficient liquor circulation. The liquor is then discharged, and the dyed material is rinsed twice at 50° C. and twice at 80° C. Fresh liquor is then added and heated to 98° C. After a 10 minute treatment, the liquor is discharged, replenished, and the goods are again treated at 98° C. for 10 minutes. The liquor is then discharged, and the dyed goods are rinsed with cold water.

This gives a brilliant yellow dyeing having good fastness properties.

EXAMPLE 2

100 parts of cotton knitwear are treated at 60° C. with 800 parts of an aqueous dyeing liquor containing ½ part of sodium bicarbonate and 50 parts of sodium chloride.

200 parts of an aqueous dyeing liquor containing 3 parts of a standardized dyestuff mixture consisting of 70 parts of dyestuff 2B 30 parts of dyestuff 1B are then metered in over a period of about 30 minutes. After 30 minutes, 20 parts of sodium carbonate (anhydrous) are added, and dyeing is carried out at 60° C. with vigorous agitation of the goods and efficient liquor circulation. The rinsing process as described in Example 1 is then carried out.

This gives a red dyeing having good fastness properties.

Dyestuff 2B has the formula:

30 minutes, 20 parts of sodium carbonate (anhydrous) are added, and dyeing is carried out at 60° C. with vigorous agitation of the goods and efficient liquor circulation. The rinsing process as described in Example 1 is then carried out.

This gives a blue dyeing having good fastness properties.

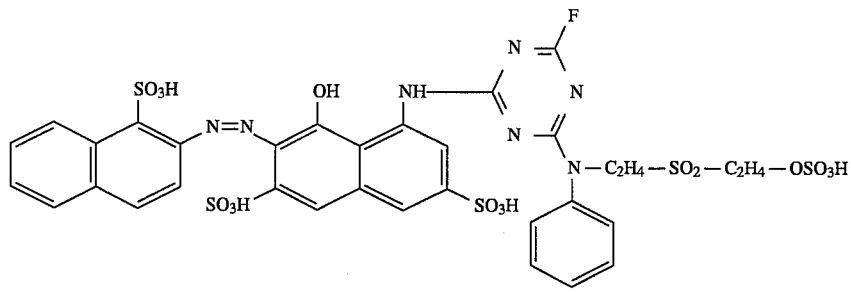

Dyestuff 1B has the formula:

Dyestuff 2C has the formula:

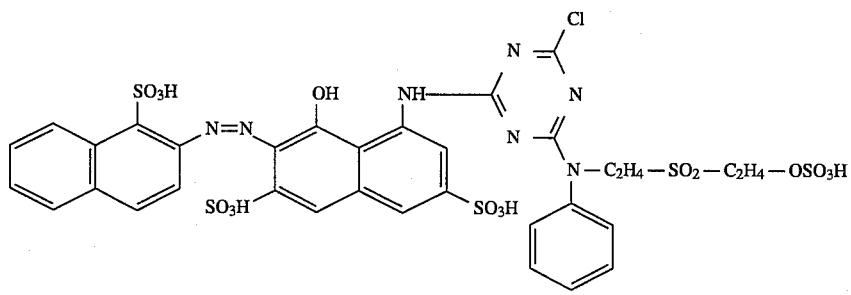

EXAMPLE 3

100 parts of cotton knitwear are treated at 60° C. with 800 parts of an aqueous dyeing liquor containing ½ part of sodium bicarbonate and 50 parts of sodium chloride.

200 parts of an aqueous dyeing liquor containing 3 parts of a standardized dyestuff mixture consisting of 90 parts of dyestuff 2C 10 parts of dyestuff 1C are then metered in over a period of about 30 minutes. After

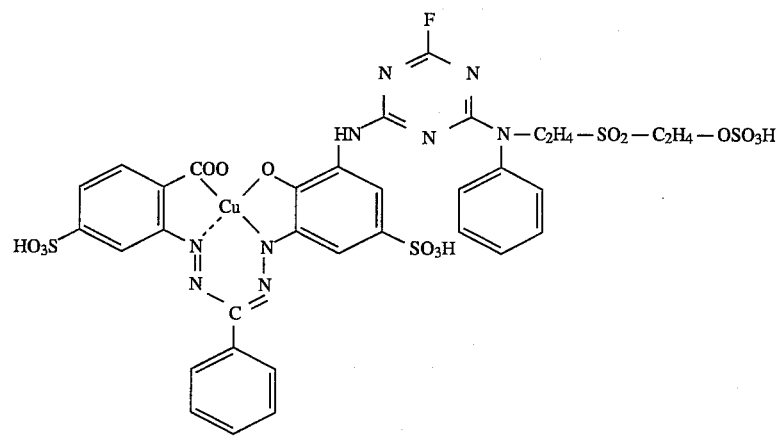

Dyestuff 1C has the formula:

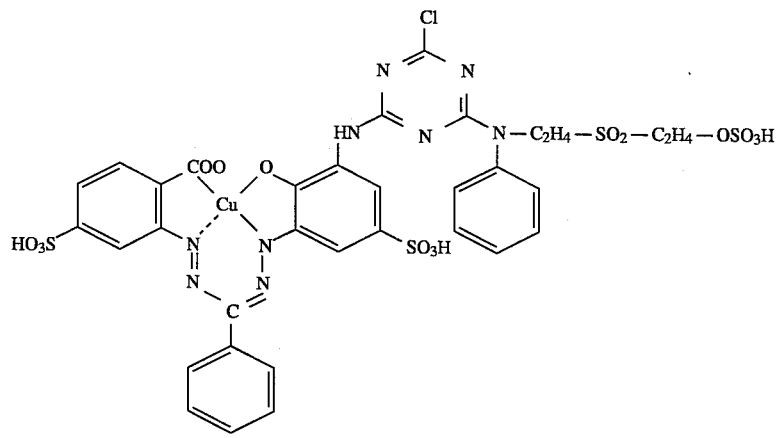

EXAMPLE 4

100 parts of cotton knitwear are treated at 60° C. with 800 parts of an aqueous dyeing liquor containing
½ part of sodium bicarbonate and
50 parts of sodium chloride.
200 parts of an aqueous dyeing liquor containing
2.5 parts of a standardized dyestuff mixture consisting of
60 parts of dyestuff 2D
40 parts of dyestuff 1D
are then metered in over a period of about 30 minutes. After 30 minutes, 20 parts of sodium carbonate (anhydrous) are added, and dyeing is carried out at 60° C. with vigorous agitation of the goods and efficient liquor circulation. The rinsing process as described in Example 1 is then carried out.

This gives a yellow dyeing having good fastness properties.

Dyestuff 2D has the formula:

EXAMPLE 5

100 parts of cotton knitwear are treated at 60° C. with 800 parts of an aqueous dyeing liquor containing
½ part of sodium bicarbonate and
50 parts of sodium chloride.
200 parts of an aqueous dyeing liquor containing
3 parts of a standardized dyestuff mixture consisting of
70 parts of dyestuff 2E
30 parts of dyestuff 1E
are then metered in over a period of about 30 minutes. After 30 minutes, 20 parts of sodium carbonate (anhydrous) are added, and dyeing is carried out at 60° C. with vigorous agitation of the goods and efficient liquor circulation. The rinsing process as described in Example 1 is then carried out.

This gives a blue-red dyeing having good fastness properties.

Dyestuff 2E has the formula:

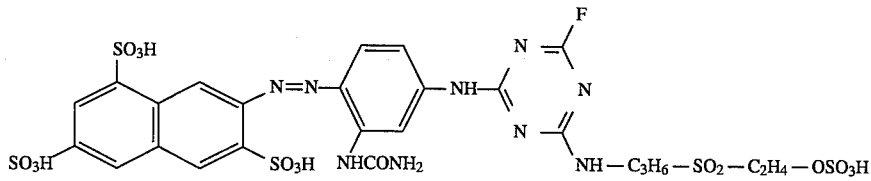

Dyestuff 1D has the formula:

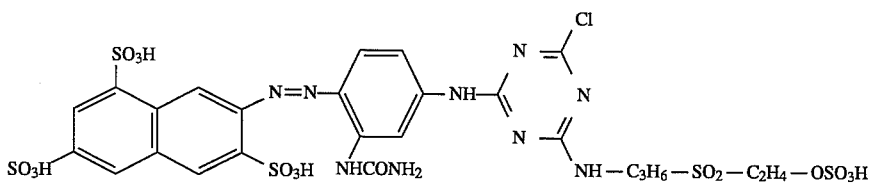

Dyestuff 1E has the formula:

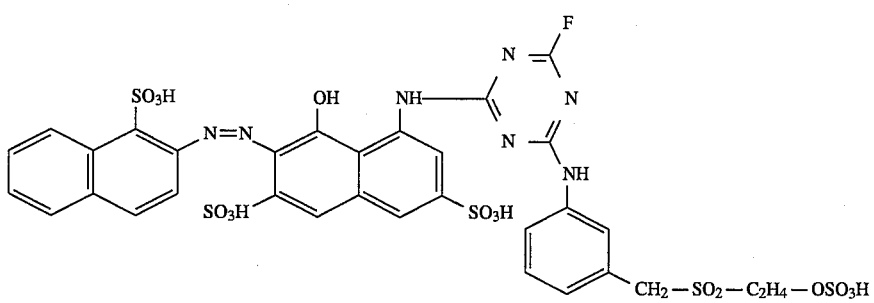

rinsing process as described in Example 1 is then carried out.

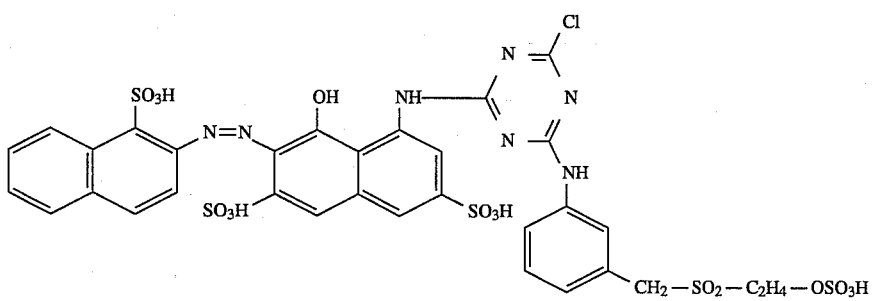

EXAMPLE 6

100 parts of cotton knitwear are treated at 60° C. with 800 parts of an aqueous dyeing liquor containing
- ½ part of sodium bicarbonate and
- 50 parts of sodium chloride.

200 parts of an aqueous dyeing liquor containing
- 3.5 parts of a standardized dyestuff mixture consisting of
  - 90 parts of dyestuff 2F
  - 10 parts of dyestuff 1F are then metered in over a period of about 30 minutes. After 30 minutes, 20 parts of sodium carbonate (anhydrous) are added, and dyeing is carried out at 60° C. with vigorous agitation of the goods and efficient liquor circulation. The rinsing process as described in Example 1 is then carried out.

This gives a blue dyeing having good fastness properties.

Dyestuff 2F has the formula:

Dyestuff 1F has the formula:

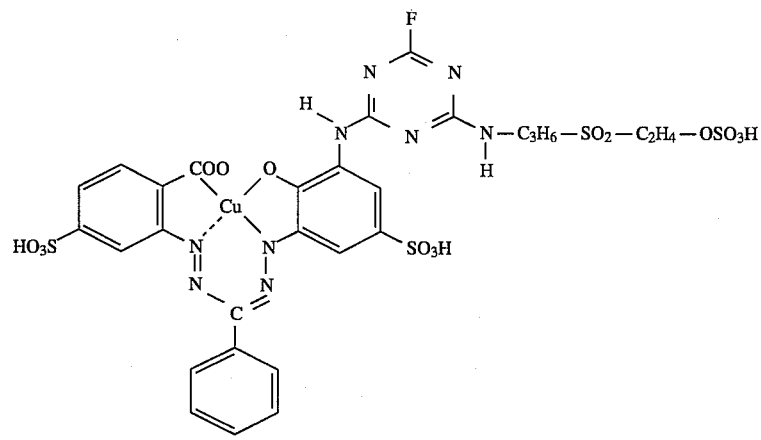

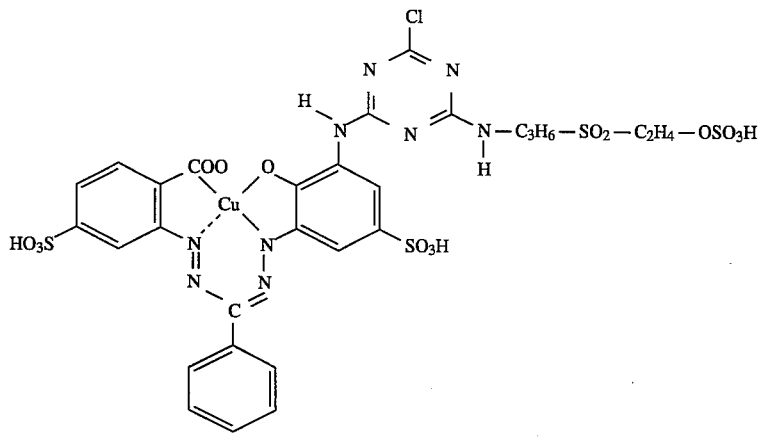

We claim:

1. A reactive dyestuff mixture comprising one or more of a monochlorotriazine dyestuff of the formula

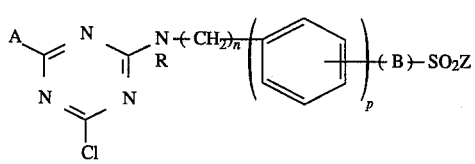
(1)

and one or more of a monofluorotriazine dyestuff of the formula

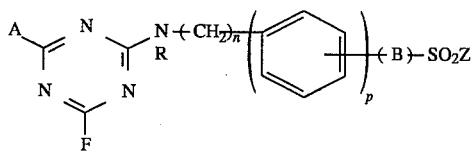
(2)

in which

A denotes a chromophoric radical

R denotes H, optionally substituted $C_1$–$C_4$-alkyl wherein the substituents are OH, $SO_3H$, $OSO_3H$, $SO_2Z$, CN or $CO_2H$, benzyl or optionally substituted phenyl wherein the substituents are halogen, $C_1$–$C_4$-alkyl, $C_1$–$C_4$-alkoxy-, $SO_3H$, or $CO_2H$ n denotes 0, 1, 2 or 3 p denotes 0 or 1

B denotes $-(CH_2)_{1-6}$, CONH $-(CH_2)_{2-4}$ or a direct bond and

Z denotes vinyl or $CH_2CH_2$—Y where Y=a radical which can be eliminated under alkaline conditions, and the meanings in formula (2) are independent of the meanings in formula (1) wherein the weight ratio of the dyestuff of formula (1) to the dyestuff of formula (2) is 95:5 to 5:95.

2. A dyestuff mixture according to claim 1, which comprises one or more of a monochlorotriazine dyestuff of the formula

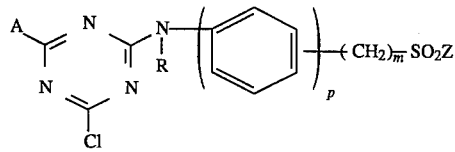
(3)

and one or more of a monofluorotriazine dyestuff of the formula

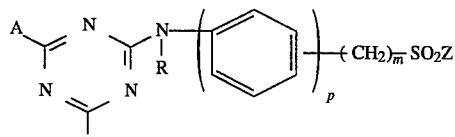
(4)

in which

R denotes H, $C_1$–$C_4$-alkyl, or optionally substituted phenyl wherein the substituents are $CH_3$, $So_3H$ or $CO_2H$ m denotes 0, 1, 2 or 3.

3. A reactive dyestuff mixture according to claim 1, comprising one or more of a monochlorotriazine dyestuff of the formula

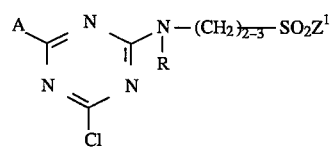
(5)

and one or more of a monofluorotriazine dyestuff of the formula

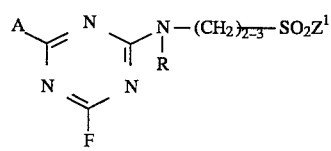
(6)

in which

R denotes phenyl or H, $Z^1$ denotes vinyl, $CH_2CH_2Cl$ or $CH_2CH_2OSO_3H$.

4. A reactive dyestuff mixture according to claim 1, comprising one or more of a monochlorotriazine dyestuff of the formula

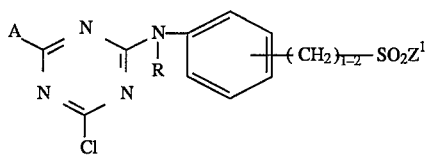

and one or more of a monofluorotriazine dyestuff of the formula

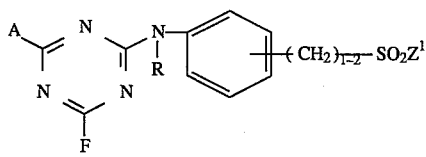

in which

R denotes H, $C_2H_5$, $CH_2CH_2OH$ or $CH_2CH_2CO_2H$ $Z^1$ denotes vinyl, $CH_2CH_2Cl$ or $CH_2CH_2OSO_3H$.

5. A reactive dyestuff mixture according to claim 1, wherein A is an azo, polyazo, metal complex azo, anthraquinone, formazan, phthalocyanine or triphendioxazine radical.

6. A reactive dyestuff mixture according to claim 1, wherein

R is H

Z is vinyl or $—C_2H_4—OSO_3H$.

7. A reactive dyestuff mixture according to claim 1, wherein

R denotes optionally substituted phenyl wherein the substituents are $C_1–C_4$-alkyl, $C_1–C_4$-alkoxy, $SO_3H$, or $CO_2H$ Z denotes vinyl or $—C_2H_4—OSO_3H$.

8. A dyestuff mixture according to claim 1, which further comprises up to 50 parts of an inorganic salt per part of dyestuff (1) and a buffer resulting in a buffering range of between pH 6.5 to 7.5.

9. A dyestuff mixture according to claim 1, which further comprises 0.5 to 10 parts by weight of an organic, anionic dispersant and 0.5 part by weight of a dustproofing agent, both relative to the entire mixture.

10. A process for dyeing cellulose fibres or cellulose blend fibres with a mixture of reactive dyestuffs, which comprises allowing a mixture according to claim 1 to come into contact with said fibres.

11. A hydroxyl- or amido- containing textile which has been produced by dyeing said textile with a mixture of dyestuff of the formula

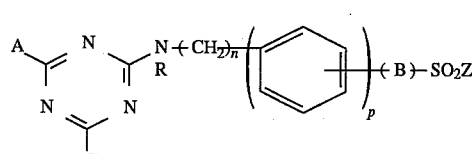

and a dyestuff of the formula

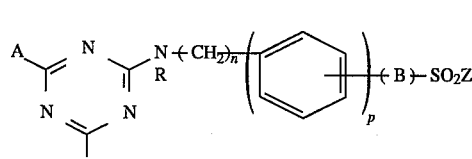

wherein the weight ratio of the dyestuff of formula (1) to the dyestuff of formula (2) is 95:5 to 5.95 in which A denotes a chromophoric radical R denotes H, optionally substituted $C_1–C_4$-alkyl wherein the substituents are OH, $SO_3H$, $OSO_3H$, $SO_2—$, CN or $CO_2H$, benzyl or optionally substituted phenyl wherein the substituents are halogen, $C_1–C_4$-alkyl, $C_1–C_4$-alkoxy, $SO_3H$ or $CO_2H$ n denotes 0, 1, 2 or 3 p denotes 0 or 1

B denotes $—(CH_2)_{1-6}$, $CONH—(CH_2)_{2-4}$ or a direct bond and

Z denotes vinyl or $CH_2CH_2—Y$, Y being a radical which can be eliminated under alkaline conditions, and the meanings in formula (2) are independent of the meanings in formula (1).

* * * * *